(12) United States Patent
Bohn et al.

(10) Patent No.: US 8,225,703 B2
(45) Date of Patent: Jul. 24, 2012

(54) HOLD-DOWN DEVICE FOR PLATE SHEARS

(75) Inventors: Andreas Bohn, Hilchenbach (DE);
Thomas Baur, Hilchenbach (DE);
Ulrich Meinhardt, Hilchenbach (DE)

(73) Assignee: SMS Siemag AG, Düsseldorf (DE)

( * ) Notice: Subject to any disclaimer, the term of this patent is extended or adjusted under 35 U.S.C. 154(b) by 297 days.

(21) Appl. No.: 12/443,301

(22) PCT Filed: Aug. 16, 2007

(86) PCT No.: PCT/DE2007/001472
§ 371 (c)(1),
(2), (4) Date: Mar. 27, 2009

(87) PCT Pub. No.: WO2008/037240
PCT Pub. Date: Apr. 3, 2008

(65) Prior Publication Data
US 2009/0288536 A1  Nov. 26, 2009

(30) Foreign Application Priority Data
Sep. 27, 2006  (DE) .......................... 10 2006 047 078

(51) Int. Cl.
*B23D 33/08*  (2006.01)
(52) U.S. Cl. .......................................... 83/452; 83/466

(58) Field of Classification Search .................. 83/451, 83/452, 422, 466; 269/32, 228, 229; 72/405.02
See application file for complete search history.

(56) References Cited

U.S. PATENT DOCUMENTS

| | | | | |
|---|---|---|---|---|
| 2,506,436 A | * | 5/1950 | Seybold | 269/32 |
| 4,008,885 A | * | 2/1977 | Einhaus et al. | 269/162 |
| 4,679,473 A | * | 7/1987 | Hirata et al. | 83/157 |
| 5,062,333 A | | 11/1991 | Ogasawara | |
| 6,638,191 B1 | * | 10/2003 | Hankins et al. | 474/113 |
| 2003/0079591 A1 | * | 5/2003 | Cote et al. | 83/161 |

FOREIGN PATENT DOCUMENTS

| | | | |
|---|---|---|---|
| DE | 239 479 | | 10/1911 |
| DE | 416424 | * | 7/1925 |
| DE | 616577 | * | 7/1935 |
| DE | 2946718 | * | 5/1981 |
| DE | 35 46 859 | | 11/1985 |
| DE | 3546859 | * | 11/1985 |
| GB | 2 208 363 | | 3/1989 |
| GB | 2208363 | * | 3/1989 |

* cited by examiner

*Primary Examiner* — Stephen Choi
(74) *Attorney, Agent, or Firm* — Cozen O'Connor

(57) ABSTRACT

A hold-down device for plate shears configured to, be pressed down onto a plate to be cut by a mechanically controlled, non-variable displacement. A hold-down device, which can be altered in terms of the pressing force and consequently permits a longer edge life and shorter displacements, and in turn lower indexing times. The starting position of the hold-down device is set before the beginning of the displacement.

9 Claims, 3 Drawing Sheets

HOLD-DOWN DEVICE FOR PLATE SHEARS

PRIORITY CLAIM

This is a U.S. national stage of application No. PCT/DE2007/001472, filed on Aug. 16, 2007, which claims priority to the German Application No.: 10 2006 047 078.8, filed: Sep. 27, 2006; the contents of both are incorporated herein by reference.

BACKGROUND OF THE INVENTION

1. Field of the Invention

The invention is directed to a hold-down device for plate shears, which can be pressed on a plate, to be cut by a mechanically controlled, invariable displacement.

2. Description of Prior Art hold-down device presses on the lower shear table while the plate is being cut. The hold-down device should be free of the plate while the plate is being transported. In particular, the operating cycle compresses: forward transport, safety angle, cut, safety angle, forward transport.

In practice, the hold-down device must usually cover the entire range of thickness of the plate from about 5 mm to about 50 mm. This requires a large displacement of the hold-down device. The design of the hold-down device is oriented to the thinnest plate in order to achieve the necessary contact pressing force. Its constant displacement is compensated for in spring sets. Consequently, the contact pressing force increases as the thickness of the plate increases. Thicker plates require less contact pressing force, or none at all, because of their greater inherent weight. The running of the hold-down device is continuous owing to its mechanical coupling and its displacement cannot be varied.

DE 35 46 859 C2 discloses a hold-down device for plate shears which is movable with a constant displacement by means of articulated levers.

SUMMARY OF THE INVENTION

An object of the invention to provide a hold-down device whose contact pressing force is variable and which therefore enables a longer edge life, shorter displacements and, in turn, shorter switching times.

This object is met according to one embodiment of the invention by a hold-down device wherein the initial position of the the hold-down device before the start of the displacement is adjustable.

Further, the above-stated object is met in one embodiment by a hold-down device, wherein a threaded rod with right-handed and left-handed thread is provided between a roller lever and actuating levers so that a distance between the roller lever and the actuating levers is varied by rotation.

The adjustable hold-down device according to the invention is positioned at a constant distance above the upper edge of the plate and therefore has the same spring path, i.e., the same contact pressing force, for every plate thickness. The displacement can accordingly be reduced and the switching time can therefore be shortened. The hold-down device can be set down on the plate sooner and can exert its force for a longer time. The hold-down device is on the plate at the start of the cut and is only displaced at the end of the cut. By further displacement over the end positions of the hold-down device, this hold-down device can also be switched off, for which purpose the roller lever can be raised from the cam disk.

According to an embodiment, the threaded rod can be rotated by means of a drive unit.

According to an embodiment of the invention, the threaded rod is rotated by a drive unit.

According to another embodiment of the invention, springs are provided between the parts of the threaded rod to hold the thread without play in order to prevent damage to the thread and in particular to prevent movements due to play during a change in force.

BRIEF DESCRIPTION OF THE DRAWINGS

The invention will be described in the following with reference to an embodiment example which is shown schematically in the drawings.

DETAILED DESCRIPTION OF THE PRESENTLY PREFERRED EMBODIMENTS

Figure 1:
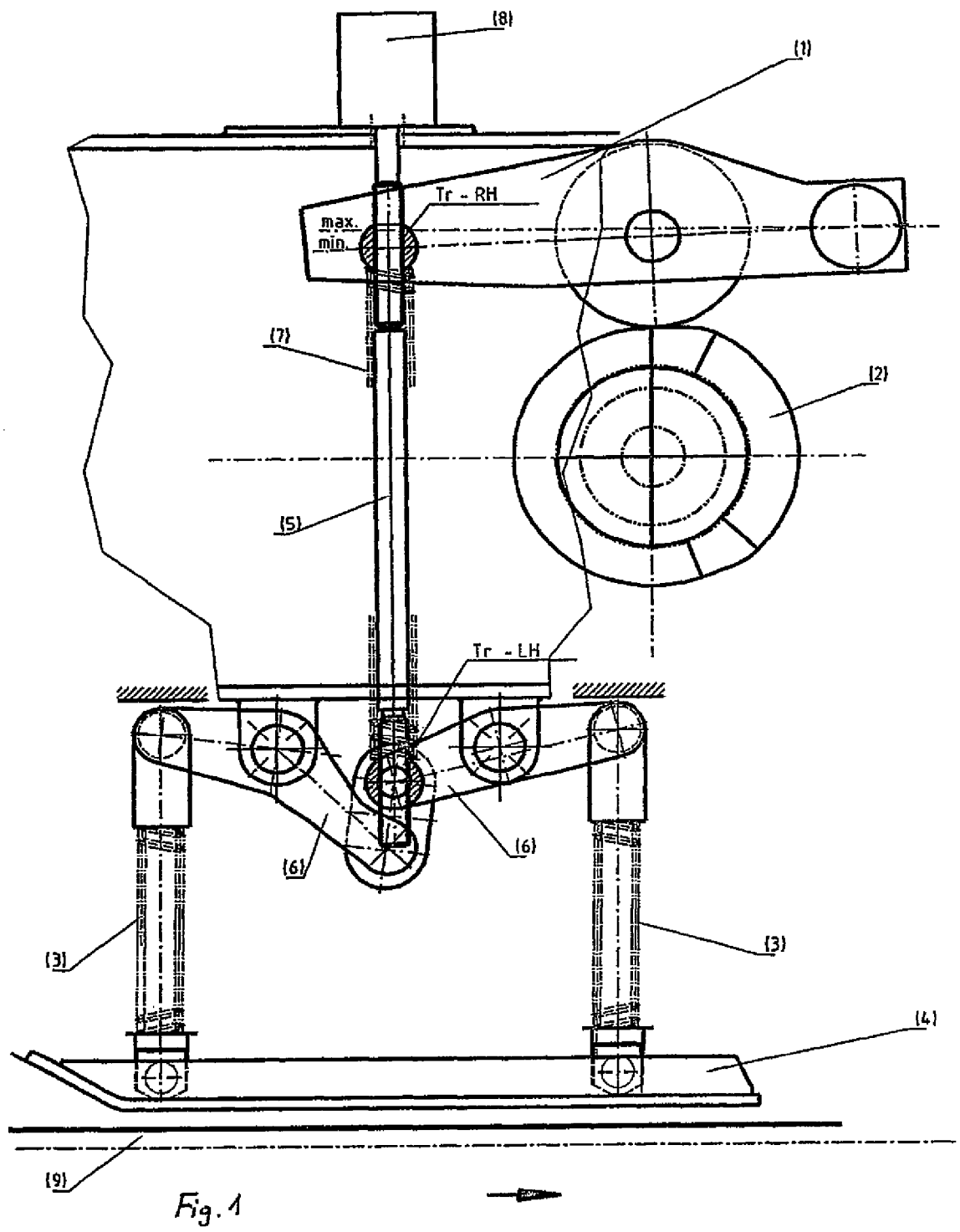
FIG. 1 shows a schematic view of a vertical section of a hold-down device prior to displacement.

A first embodiment of a hold-down device is shown in vertical section in FIG. 1. The embodiment shown in the drawing has a hold-down device 4 which is backed off from plate 9 before its displacement. The hold-down device 4 is held at both sides by actuating levers 6 so as to be movable. The actuating levers 6 are connected to roller lever 1 at its end, which is movable upward and downward, by threaded rod 5, having a right-handed and left-handed thread. The roller lever 1 can be actuated by means of cam disk 2. Invariable displacing movement of the roller lever 1 can accordingly be transmitted to the hold-down device 4. The initial position of the hold-down device 4 is determined by an efficient distance between the roller lever 1 and the actuating levers 6, which is variable by rotating the threaded rod 5. The threaded rod 5 is adjustable can be adjusted by drive unit 8 in such a way that the initial position of the hold-down device 4 is set to a constant height above the plate. This is accomplished, for example, when a plate having a different thickness is fed to the cutting process for cutting. In order to prevent damage to the thread of the threaded rod 5, the threads are tensioned by spring 7.

Figure 2:
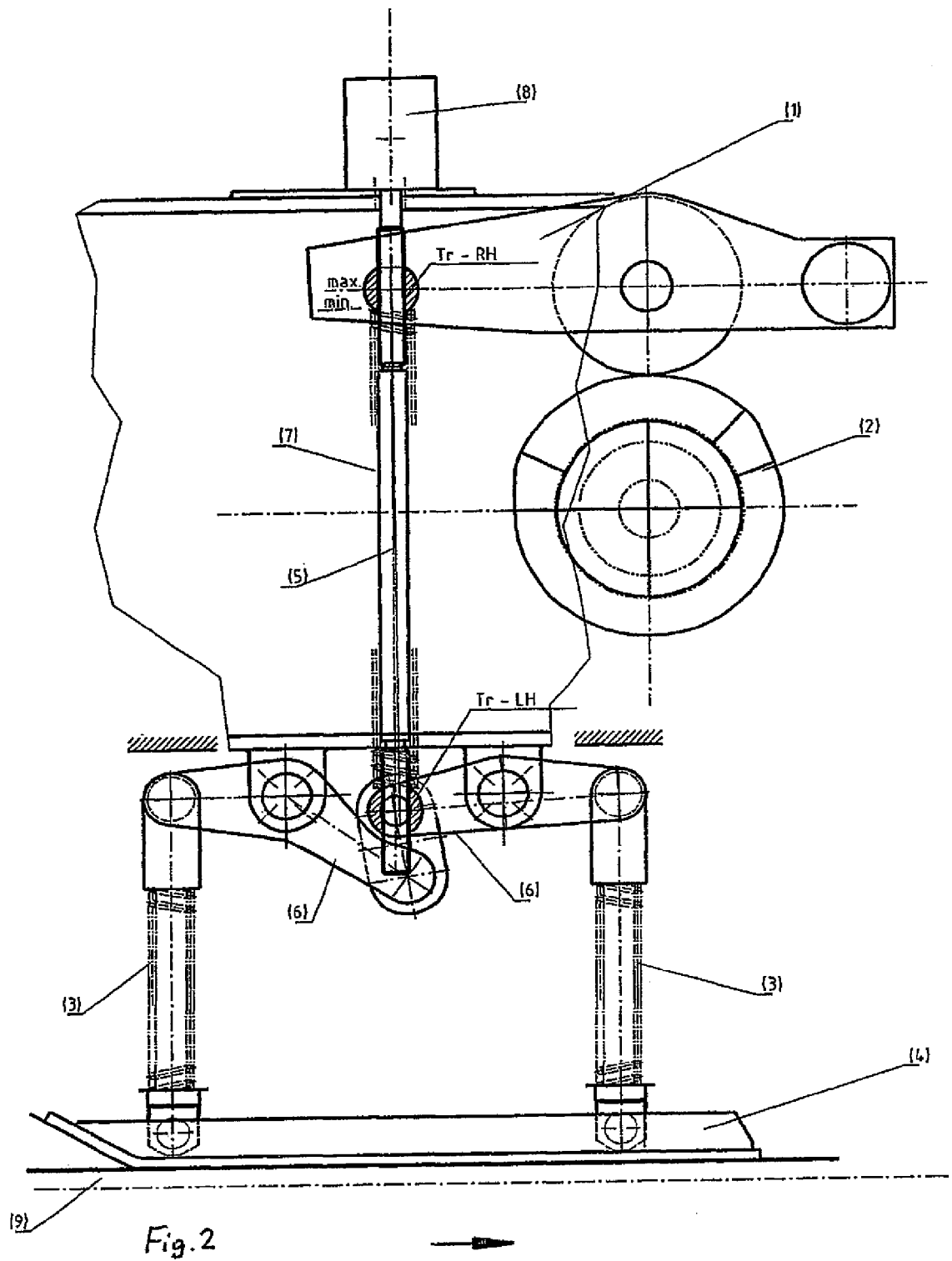
FIG. 2 shows a schematic view of a vertical section of a lowered hold-down device.

FIG. 2 is a hold-down device in the same view as shown in FIG. 1. In this case, the hold-down device 4 is pressed down on the plate 9. In this position, the cam disk 2 engages with the roller lever 1 by its large radius. The spring sets 3 between the actuating levers 6 and the hold-down device 4 are compressed. Spring sets 3 compensate for the difference between the longer displacement and the shorter distance between the plate and the initial position of the hold-down device 4. Due to the fact that the distance between the plate and the initial position of the hold-down device 4 can be maintained constant, according to the invention for different plate thicknesses, the plates 9 can be held down with a constant force.

Figure 3:
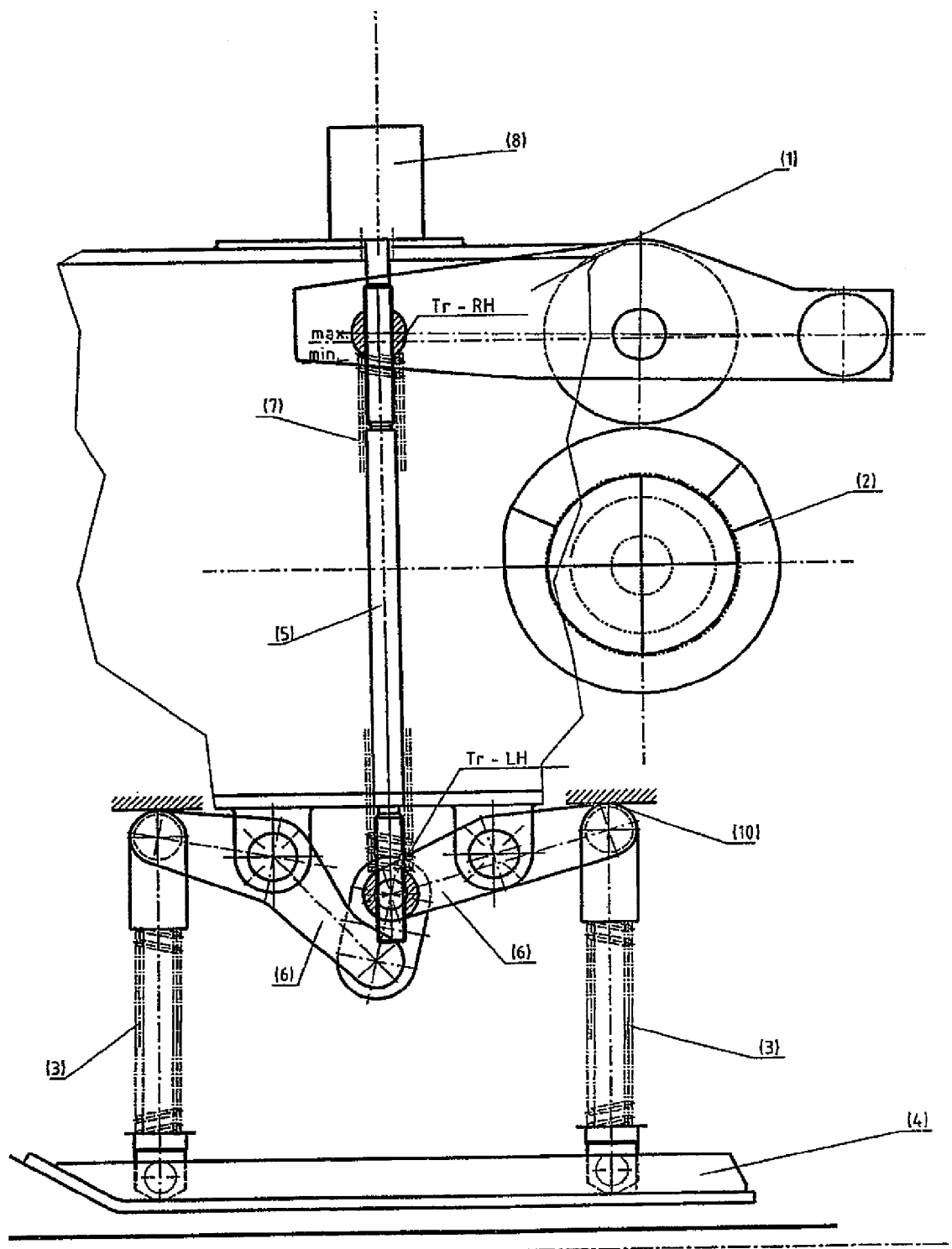
FIG. 3 shows a schematic view of a vertical section of a switched off hold-down device.

FIG. 3 shows the hold-down device from FIGS. 1 and 2 in the same view but in the switched off state. In this case, the distance between the actuating levers 6 and the roller lever 1 is lengthened by rotating the threaded rod 5 such that the hold-down device 4 is initially raised into an end position in which the actuating levers 6 contact a stop 10 and the roller lever 1 is lifted from the cam disk 2 by further rotation of the threaded rod 5. The switching off of the hold-down device 4 is suitable for cutting processes with thick plates which are already held down sufficiently by their own weight.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claiamed is:

1. A hold-down apparatus for plate shears, the hold down apparatus comprising:
   a hold-down device; and
   a mechanically controlled invariable displacement apparatus configured to press the hold-down device on a plate to be out by the plate shears, wherein the mechanically controlled invariable displacement apparatus further comprises:
   a cam having a cam surface;
   a roller lever configured to ride on the cam surface and to be raised from the cam surface;
   at least one actuating lever coupled to the hold-down device; and
   a threaded rod, the threaded rod having a first end with right-handed thread and a second end with a left-handed thread, the threaded rod coupled between the roller lever and the at least one actuating lever,
   wherein an initial position of the hold-down device, before the start of the invariable displacement, is adjustable,
   wherein a distance between the roller lever and the at least one actuating lever is varied by rotation of the threaded rod,
   whereby the initial position of the hold-down device is adjusted by the threaded rod.

2. The hold-down apparatus according to claim 1, wherein the mechanically controlled invariable displacement apparatus further comprises at least one pressure spring coupled between the at least one actuating lever and the hold-down device.

3. The hold-down apparatus according to claim 1, further comprising a drive unit configured to rotate the threaded rod.

4. The hold-down apparatus according to claim 1, wherein at least one of the right-handed thread and the left-handed thread of the threaded rod is tensioned by a spring.

5. The hold-down apparatus according to claim 1, further comprising a stop configured to limit a movement of the at least one actuating lever.

6. The hold-down apparatus according to claim 5, wherein the roller lever is configured to be raised from the cam surface after the movement of the at least one actuator is limited by the stop.

7. The hold-down apparatus according to claim 5, wherein the roller lever is raised from the cam surface by rotating the threaded rod after the at least one actuator is limited by the stop.

8. The hold-down apparatus according to claim 1, wherein the cam surface is configured to control the displacement.

9. The hold-down apparatus according to claim 1, further comprising a coupling link configured to connect the threaded rod to the at least one actuating lever.

* * * * *